US012811984B2

(12) United States Patent
Ezrielev et al.

(10) Patent No.: US 12,811,984 B2
(45) Date of Patent: Nov. 24, 2026

(54) MANAGING POLICY GENERATION FOR DATA PROCESSING SYSTEMS BASED ON INFERENCE MODEL PREDICTIONS

(71) Applicant: Dell Products L.P., Round Rock, TX (US)

(72) Inventors: Ofir Ezrielev, Be'er Sheva (IL); Hanna Yehuda, Acton, MA (US); Yonit Lopatinski, Shomria (IL)

(73) Assignee: Dell Products L.P., Round Rock, TX (US)

( * ) Notice: Subject to any disclaimer, the term of this patent is extended or adjusted under 35 U.S.C. 154(b) by 189 days.

(21) Appl. No.: 18/788,535

(22) Filed: Jul. 30, 2024

(65) Prior Publication Data

US 2026/0039697 A1 Feb. 5, 2026

(51) Int. Cl.
*G06F 15/16* (2006.01)
*G06F 9/54* (2006.01)
(Continued)

(52) U.S. Cl.
CPC .......... *H04L 63/20* (2013.01); *H04L 63/1425* (2013.01)

(58) Field of Classification Search
CPC ........................................................ H04L 63/20
(Continued)

(56) References Cited

U.S. PATENT DOCUMENTS 8,244,559 B2 * 8/2012 Horvitz ................. G06F 9/5027 705/30
9,083,581 B1 7/2015 Addepalli et al.
(Continued)

FOREIGN PATENT DOCUMENTS

CN 109286526 A * 1/2019 ......... H04L 43/0876
EP 4276665 A1 * 11/2023 ........... G06F 21/577
(Continued)

OTHER PUBLICATIONS

Bohan Leng et al., "Digital twin monitoring and simulation integrated platform for reconfigurable manufacturing systems", ScienceDirect, Advanced Engineering Informatics, vol. 58, Oct. 2023, 102141, <https://www.sciencedirect.com/science/article/abs/pii/S1474034623002690> retrieved on Jul. 26, 2024 (7 pages).
(Continued)

*Primary Examiner* — Hamza N Algibhah
(74) *Attorney, Agent, or Firm* — WOMBLE BOND DICKINSON (US) LLP

(57) ABSTRACT

Methods and systems for managing inference models are disclosed. To manage inference models, input data may be obtained, the input data being usable by at least one inference model to generate a plurality of predictions. Each of the plurality of predictions may indicate whether a future state will occur. A state analysis process may be performed to determine whether a new policy is to be generated for the state. If a new policy is to be generated for the state, the new policy may include an action set to be performed under conditions indicated by the input data and/or the plurality of predictions. The action set may be performed to update operation of one or more data processing systems that may be impacted by the state and computer-implemented services may be provided based on the updated operation.

20 Claims, 7 Drawing Sheets

(51) Int. Cl.
*H04L 9/40* (2022.01)
*H04L 29/06* (2006.01)

(58) Field of Classification Search
USPC .......................................................... 726/1
See application file for complete search history.

(56) References Cited

U.S. PATENT DOCUMENTS 9,508,095 B2 * 11/2016 Stella ........................ H04L 67/14
10,438,287 B2 * 10/2019 Crowley ................ G06Q 40/04
10,678,602 B2 * 6/2020 Manglik ................... G06F 8/61
11,556,449 B2 1/2023 Rakshit
11,676,098 B2 6/2023 Berti et al.
11,689,620 B2 6/2023 Mukhopadhyay et al.
11,853,187 B1 12/2023 Roche
12,008,649 B1 * 6/2024 Gordon, III .......... H04L 9/0643
12,052,285 B1 * 7/2024 Anjaneyapura Range .................. H04L 63/20
12,204,939 B1 * 1/2025 Brown ................ G06F 11/3433
2003/0041011 A1 * 2/2003 Grey ...................... G06Q 40/04 705/37
2007/0180490 A1 * 8/2007 Renzi .................... G06F 21/604 726/1
2008/0072231 A1 * 3/2008 Yoshida ................. G06Q 10/06 718/104
2010/0036779 A1 * 2/2010 Sadeh-Koniecpol ... H04L 63/20 709/224
2010/0076856 A1 * 3/2010 Mullins .............. G06Q 30/0601 705/26.1
2010/0332262 A1 * 12/2010 Horvitz ................. G06F 9/5072 705/26.1
2011/0252474 A1 10/2011 Ward
2012/0131591 A1 * 5/2012 Moorthi ................ G06F 9/5061 718/104
2012/0239739 A1 * 9/2012 Manglik ................... G06F 8/61 709/203
2014/0067779 A1 * 3/2014 Ojha ................... G06F 16/1734 707/694
2014/0164059 A1 6/2014 Dove
2014/0278808 A1 * 9/2014 Iyoob ................. G06Q 30/0206 705/7.35
2014/0372167 A1 * 12/2014 Hillier .............. G06Q 10/06315 705/7.24
2015/0193796 A1 * 7/2015 Gerrity .............. G06Q 30/0206 705/7.35
2015/0379542 A1 * 12/2015 Lian ................... G06Q 30/0206 705/7.35
2016/0212168 A1 * 7/2016 Dotan ...................... H04L 63/20
2016/0226955 A1 * 8/2016 Moorthi ................ G06F 9/5066
2017/0109815 A1 * 4/2017 Bai ........................ G06Q 30/08
2017/0126741 A1 * 5/2017 Lang ........................ H04L 63/20
2018/0069899 A1 * 3/2018 Lang ......................... G06F 8/38
2018/0089582 A1 * 3/2018 Bouillet ................. G06N 20/20
2019/0013870 A1 1/2019 Ji et al.
2019/0155643 A1 * 5/2019 Bhageria ................. H04L 9/008
2019/0182755 A1 * 6/2019 Robb ..................... H04W 12/06
2019/0324879 A1 * 10/2019 Abraham ............ G06F 11/3079
2019/0356688 A1 * 11/2019 Ford ...................... H04L 63/102
2019/0387003 A1 * 12/2019 Ford ...................... H04L 63/102
2020/0153921 A1 * 5/2020 Kolluri Venkata Sesha ................ H04L 67/10
2020/0225990 A1 * 7/2020 Vaddi ...................... G06F 9/455
2020/0303047 A1 9/2020 Bostic et al.
2020/0314174 A1 * 10/2020 Dailianas ............ G06F 9/45558
2020/0314175 A1 * 10/2020 Dailianas ........... G06Q 30/0283
2021/0049284 A1 * 2/2021 Tyagi .................... G06F 21/629
2021/0049460 A1 2/2021 Ahn
2021/0226983 A1 * 7/2021 Cunningham ........ H04L 63/102
2021/0383018 A1 12/2021 Keskikangas
2022/0109701 A1 * 4/2022 Zeng ..................... H04L 63/205
2022/0188949 A1 * 6/2022 Mulligan ............... G06Q 50/18
2022/0198369 A1 * 6/2022 Oyamada ....... G06Q 10/063114
2022/0237688 A1 * 7/2022 Teh .................... G06Q 30/0637
2023/0067128 A1 3/2023 Engelberg et al.
2023/0092066 A1 3/2023 Cella et al.
2023/0403301 A1 * 12/2023 Fong ........................ H04L 63/20
2023/0412629 A1 * 12/2023 Beveridge ........... H04L 63/1433
2024/0022607 A1 * 1/2024 Lang ........................ H04L 63/20
2024/0062879 A1 * 2/2024 Stranjak ................. G06N 5/043
2024/0223609 A1 7/2024 Mikolajczyk
2024/0323217 A1 * 9/2024 Ezrielev ................ G06F 21/577
2024/0329610 A1 * 10/2024 Huber ....................... G06N 7/01
2024/0364592 A1 * 10/2024 Adapa ................. H04L 41/0894
2025/0007952 A1 1/2025 Tiwari
2025/0166033 A1 * 5/2025 Negron-Moreno .......................... G06Q 30/0619
2025/0251705 A1 * 8/2025 Qu ..................... G05B 13/0265
2025/0274378 A1 * 8/2025 Singh ....................... H04L 45/04
2025/0284969 A1 * 9/2025 Qu .......................... G06N 3/092
2025/0335259 A1 * 10/2025 Kumar .................. G06F 9/5038
2025/0335275 A1 * 10/2025 Ottar ................... G06F 11/3452
2025/0378493 A1 * 12/2025 Choi ....................... G06Q 40/04

FOREIGN PATENT DOCUMENTS

EP 4586684 A1 * 7/2025 ......... H04L 41/0853
EP 4633224 A1 * 10/2025 ........... H04L 41/085
WO WO-2013131186 A1 * 9/2013 ....... G06Q 10/06315
WO WO-2024227088 A1 * 10/2024 ............. H04L 41/14

OTHER PUBLICATIONS

Edward Chen et al., "Advanced Transient Diagnostic with Ensemble Digital Twin Modeling", arXiv:2205.11469, May 23, 2022, <https://arxiv.org/abs/2205.11469> retrieved on Jul. 26, 2024 (9 pages).
"Group Policy Preferences", Microsoft Learn, Aug. 31, 2016, <https://learn.microsoft.com/en-us/previous-versions/ windows/it-pro/windows-server-2012-r2-and-2012/dn581922(v=ws. 11)> retrieved on Jul. 26, 2024 (10 pages).
Luo Ji et al., "An Adaptive Framework of Geographical Group-Specific Network on O2O Recommendation", arXiv:2312.17072v1, Dec. 28, 2023, pp. 1-8, <https://arxiv.org/pdf/2312.17072v1> retrieved on Jul. 26, 2024 (8 pages).
Mingbin Ben Feng and Eunhye Song, "Efficient Nested Simulation Experiment Design via the Likelihood Ratio Method", arXiv:2008. 13087v3, May 13, 2024, pp. 1-43, <https://arxiv.org/pdf/2008. 13087> retrieved on Jul. 26, 2024 (43 page).
Chao Wang et al., "Optimal Nested Test Plan for Combinatorial Quantitative Group Testing", arXiv:1407.2283v5, Oct. 23, 2017, pp. 1-14, <https://arxiv.org/pdf/1407.2283> retrieved on Jul. 26, 2024 (14 pages).
Vojtech Kovarik et al., "Recursive Joint Simulation in Games", arXiv:2402.08128v2, Mar. 2, 2024, pp. 1-24, <https://arxiv.org/pdf/2402.08128> retrieved on Jul. 26, 2024 (24 pages).

* cited by examiner

MANAGING POLICY GENERATION FOR DATA PROCESSING SYSTEMS BASED ON INFERENCE MODEL PREDICTIONS

FIELD

Embodiments disclosed herein relate generally to managing inference models. More particularly, embodiments disclosed herein relate to systems and methods to manage policy generation for data processing systems based on inference model predictions.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
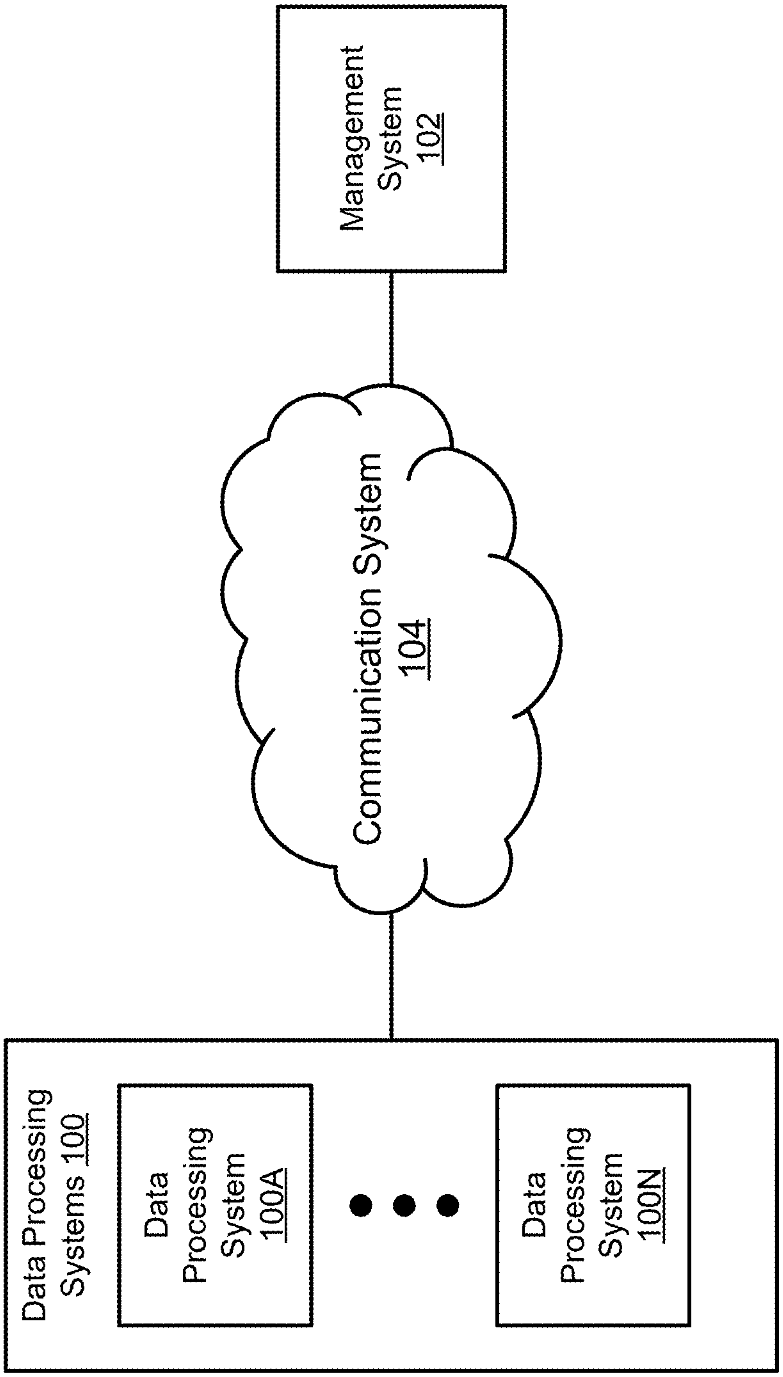
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing inference models. An inference model may be used to generate predictions regarding whether a state will occur in the future. At least a portion of the state may be interpreted as an event (e.g., a sandstorm, wind, a temperature increase). The occurrence of the state may affect the availability of resources (e.g., data processing systems, hardware/software components of a data processing system) used to provide computer-implemented services. Based on the predictions, a policy may be identified from a set of existing policies, the policy being keyed to the predicted state. The set of existing policies may define how one or more data processing systems are to operate thereby indicating a manner in which resources are to be distributed and/or otherwise accounted for so that the computer-implemented services may continue to be provided.

However, the inference model used to generate the predictions may be unreliable and/or may otherwise generate predictions that do not meet needs of a downstream consumer of the predictions (e.g., due to the inference model being trained using an incomplete, biased, and/or limited training dataset, due to stochastic elements in the inference models that may introduce variability in the predictions). As a result, a policy may be selected based on an unreliable prediction thereby causing the resources used to provide the computer-implemented services to be unavailable and/or inappropriately distributed. Thus, the computer-implemented services may be interrupted, delayed, and/or of a reduced quality.

To improve the likelihood that resources will be available to provide the computer-implemented services as desired, a plurality of predictions for the future state may be generated by at least one inference model. The plurality of predictions and/or the input data used to generate the plurality of predictions may be analyzed to determine whether a new policy is to be generated (e.g., no existing policies may be utilized to update operation of the data processing systems).

If the predicted state does not correspond to any existing policies, a new policy may be obtained and implemented for the predicted state. The new policy may be obtained via an interaction with a subject matter expert (SME) and/or via other methods. The new policy may be implemented under a set of conditions corresponding to the predicted state (e.g., the input data, the plurality of predictions).

Thus, embodiments disclosed herein may address, among other technical problems, the technical challenge of obtaining a policy to be implemented based on a state predicted by a plurality of predictions that does not correspond to any existing policies known to the system. By obtaining new policies when the above-mentioned conditions arise, an action set may be performed that may increase a likelihood of the computer-implemented services being provided to downstream consumers of the services as desired.

In an embodiment, a method for managing inference models is disclosed. The method may include: obtaining input data, the input data being usable as ingest for the at least one inference model to generate a plurality of predictions, and each of the plurality of predictions may indicate whether a state will occur in a future; performing, based on a set of existing policies that define how one or more data processing systems are to operate, a state analysis process to determine whether the input data and/or the plurality of predictions indicate that a new policy is to be generated for the state; in an instance of the state analysis process in which the input data and/or the plurality of predictions indicate that the new policy is to be generated for the state: initiating generation of the new policy for the state; performing, based on the new policy, an action set to update operation of the one or more data processing systems that are likely to be impacted by the state; and providing computer-implemented services based on the updated operation of the one or more data processing systems.

Performing the state analysis process may include: obtaining training data, the training data being previously used to train the at least one inference model; making a determination, based on the input data and the training data, regarding whether the training data comprises data values that correspond to data values of the input data to an extent that meets criteria; in an instance of the determination in which the training data does not include data values that correspond to data values of the input data to an extent that meets criteria: concluding that the input data indicates that the new policy is to be generated for the state.

The criteria may be met when at least a threshold quantity of data values of the training data corresponds to data values of the input data, and the criteria may be indicated by the set of existing policies.

Performing the state analysis process may include: analyzing the plurality of predictions to obtain a statistical characterization regarding agreement in the plurality of predictions; making a determination regarding whether the statistical characterization meets criteria; and in a first instance of the determination in which the statistical characterization does not meet the criteria: concluding that the plurality of predictions may indicate that the new policy is to be generated for the state.

The statistical characterization may include at least one quantity selected from a group consisting of: a mean; a median; a mode; and a standard deviation.

Performing the state analysis process may also include: in a second instance of the determination in which the statistical characterization does not meet the criteria: performing, using the plurality of predictions and historical state data, an anomaly detection process to determine whether the state is anomalous; in an instance of the performing in which the state is anomalous: concluding that the plurality of predictions may indicate that the new policy is to be generated for the state.

The new policy may include an action set to be performed under a set of conditions corresponding to the input data and/or the plurality of predictions.

Initiating generation of the new policy for the state may include providing the set of conditions corresponding to the input data and/or the plurality of predictions to a subject matter expert (SME).

Each prediction of the plurality of predictions may be substantially generated using the input data, and the input data may be generated by a plurality of data processing systems.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide for management of data processing systems that may provide, at least in part, computer-implemented services. The computer-implemented services may include any type and quantity of services including, for example, data services (e.g., data storage, generation, access and/or control services), communication services (e.g., instant messaging services, video-conferencing services), and/or any other type of service that may be implemented with a computing device. The computer-implemented services may be provided by, for example, data processing systems 100, management system 102, and/or any other type of devices (not shown in FIG. 1). Other types of computer-implemented services may be provided by the system shown in FIG. 1 without departing from embodiments disclosed herein.

The system may include any number and/or type of data processing systems 100 (e.g., 100A-100N). Data processing systems 100 may include any number of hardware components (e.g., processors, memory modules, storage devices, communications devices). The hardware components may support execution of any number and type of applications (e.g., software components). Changes in available functionalities of the hardware and/or software components may provide for various types of different computer-implemented services to be provided over time.

To provide the computer-implemented services, a predetermined quantity of hardware and/or software resources may be used. For example, data processing systems 100 may include robotic entities such as unmanned aerial vehicles (e.g., drones) used to provide agriculture management services. To provide the agriculture management services, the drones may be deployed to a geographic location (e.g., a field used to produce crops) to spray portions of the field with pesticide. To ensure a desired coverage of the field with pesticide, a certain number of drones may be deployed.

The provision of the computer-implemented services by data processing systems 100 may be managed by, for example, management system 102. Management system 102 may host an inference model used to generate predictions based on input data regarding occurrences of future states which may impact the provision of the computer-implemented services (e.g., performance data of the data processing systems, sensor data collected by the data processing systems, observational weather data collected by doppler radar, radiosondes, weather satellites, buoys, etc.). At least a portion of conditions indicated by the states may be interpreted as events (e.g., weather events and/or other events that may impact the operation of data processing systems 100).

Returning to the above example, management system 102 may host an inference model used to generate predictions regarding occurrences of weather events which may impact the ability of the drones to provide the agriculture management services. For example, the inference model may generate predictions regarding a likelihood that an impending thunderstorm may damage at least a portion of the drones, resulting in undesired outcomes, such as an inability of the drones to spray the pesticide.

However, the inference model used to generate the predictions may be unreliable and/or otherwise generate predictions that do not meet needs of a downstream consumer of the predictions (e.g., due to the inference model being trained using an incomplete, biased, and/or limited training dataset). Additionally, the predictions may include stochastic elements (e.g., random variance in one or more parameters over time) which may result in prediction variability. Prediction variability may reduce a reliability of using the predictions as a basis for making decisions. As a result, the predetermined quantity of hardware and/or software resources may be unavailable to provide the computer-implemented services. For example, the inference model may predict that the thunderstorm is unlikely (e.g., based on any criteria for degrees of likelihood) to adversely impact an ability of the drones to perform the agriculture management services. If the prediction is inaccurate (e.g., a portion of the drones are unable to spray pesticide as desired during and/or following the thunderstorm), the computer-implemented agriculture management services may be of a reduced quality, interrupted, and/or delayed.

In general, embodiments disclosed herein may provide methods, systems, and/or devices for managing inference models. To manage inference models, a plurality of predictions may be generated by at least one inference model regarding whether a future state will occur. The plurality of predictions may be analyzed in aggregate using statistical techniques to obtain a statistical characterization (e.g., mean, median, mode, standard deviation). The statistical characterization may include quantities which may be compared to criteria included in any number of policies. When criteria for a policy are met, an action set keyed to the policy may be performed to update operation of any of data processing systems 100 likely to be impacted by the predicted state.

However, the predicted state (e.g., predicted by the plurality of predictions) may not correspond to any existing policies. Therefore, an action set may not be available to be performed to update the operation of the data processing systems accordingly.

To determine whether any existing policies are applicable to the conditions indicated by the input data and/or the plurality of predictions, a state analysis process may be performed. During the state analysis process, the input data used to generate the plurality of predications and/or the plurality of predications may be used. For example, the input data may be compared to training data used to train the at least one inference model (e.g., to determine an extent to which the at least one inference model was trained to predict occurrences of states based on similar input data) and/or the plurality of predictions may be analyzed (e.g., statistical characterizations regarding agreement between the plurality of predictions may be obtained and analyzed, anomaly detection may be performed based on the state predicted by the plurality of predictions).

If a result of the state analysis process indicates that the existing policies may not be trusted to update operation of the data processing systems, a new policy may be obtained. The new policy may be obtained, for example, via an interaction with a SME, via an automated method (e.g., a generative model, investigating over a simulation), and/or via other methods.

An action set associated with the new policy may be performed to update the operation of the data processing systems (e.g., any number of data processing systems 100) and computer-implemented services may be provided based on the updated operation.

By doing so, a system in accordance with an embodiment may be used to generate new policies when input data and/or a plurality of predictions generated by at least one inference model do not correspond to any policies of a set of existing policies. By analyzing the input data and the plurality of predictions, new policies may be dynamically generated. In addition, action sets performed based on the new policies may be implemented to manage operation of the data processing systems in a manner that increases a likelihood of the data processing systems providing the computer-implemented services as desired.

To perform the above-noted functionality, the system of FIG. 1 may include data processing systems 100, and/or management system 102. Data processing systems 100, management system 102, and/or any other type of device not shown in FIG. 1 may perform all, or a portion of, the computer-implemented services independently and/or cooperatively. Each of these components is discussed below.

Data processing systems 100 may include any number and/or type of data processing systems (e.g., 100A-100N), which may include any number of hardware and/or software components configured to provide computer-implemented services. While providing the computer-implemented services, data processing systems 100 may generate data, such as telemetry data, performance data, sensor data, and/or other data related to operation of data processing systems 100. The data generated by data processing systems 100 may be provided to management system 102, which may provide device management services for data processing systems 100.

Management system 102 may include any number and/or type of devices (e.g., other data processing systems, servers, storage devices, user devices) that may be used to provide the device management services. As part of providing the device management services, management system 102 may train and/or host any number and/or type of inference models trained to generate inferences (e.g., predictions). Data provided to management system 102 by data processing systems 100 may include training data usable to train inference models managed by management system 102 and/or input data usable as ingest for inference models managed by management system 102.

To perform its functionality, management system 102 may (i) obtain data (e.g., from data processing systems 100, from other data sources), (ii) process the data (e.g., fill data gaps, transform the data, extract values from the data), (iii) use training data to train any number of inference models, (iv) generate a plurality of predictions (e.g. using the data as input data for the inference models) indicating whether a state will occur in a future (e.g., at any future point in time, over a duration of time beginning at a future point in time), and/or (v) perform, based on a set of existing policies that define how data processing systems 100 are to operate, a state analysis process to determine whether the input data and/or the plurality of predictions indicate that a new policy is to be generated for the state.

If the state analysis process indicates that a new policy is to be generated for the state, management system 102 may: (i) initiate generation of the new policy for the state, (ii) perform, based on the new policy, at least a portion of an action set to update operation of data processing systems 100, and/or (iii) perform other actions.

During the state analysis process, the input data may be compared to training data used to train the at least one inference model managed by management system 102. To do so, management system 102 may determine an extent to which data values of the training data correspond to data values of the input data. If the data values of the training data correspond to the data values of the input data to an extent considered sufficient (e.g., based on first criteria indicating threshold quantities of corresponding data values), an existing policy of the set of existing policies may be identified for use in updating operation of one or more data processing systems. If the data values of the training data do not correspond to the data values of the input data to the extent considered sufficient, it may be concluded that a new policy is to be generated.

For example, data processing systems 100 may include any number of unmanned aerial vehicles (e.g., drones) programmed to perform agricultural management services (e.g., to spray pesticide on a field). Input data may be obtained from any number of sensors (e.g., temperature sensors, humidity sensors, rain gauges, wind sensors) to indicate weather conditions in a geographic location in which the drones are operating. A manner of operation of the drones may be based on any number of existing policies that are keyed to various weather conditions and/or states predicted by the at least one inference model. The drones may operate based on a first policy if the sensors indicate that temperature, wind speed, precipitation, and wind direction are within ranges specified by first criteria included in the first policy. The first policy may indicate that the drones are to spray pesticides in a pattern starting from a first side of the field and ending at a second side of the field.

The first criteria may include ranges for the temperature, wind speed, precipitation, and wind direction measurements based on threshold quantities of data values of the training data that correspond to those ranges. For example, the at least one inference model may have been trained using at least 500 data values indicating wind traveling in a first direction (e.g., 180 degrees or south) and/or at least 500 instances each of any number of patterns of likely wind directions over durations of time. Therefore, the first criteria may be met when the input data includes wind direction measurements indicating wind traveling in the first direction (e.g., within a range of plus or minus ten degrees that is considered south) and/or if the input data displays a pattern that corresponds to at least one of the patterns of likely wind directions included in the training data.

However, the at least one inference model may not have been trained using at least 500 data values indicating wind traveling in a second direction (e.g., 360 degrees or north). Therefore, if input data obtained from the sensors indicates a wind direction is between 350 degrees and 10 degrees and/or if the input data displays a pattern of wind directions over a duration of time that does not match at least one from the training data, predictions generated by the inference models and/or actions sets identified to remediate potential negative impacts of the predictions may be expected to be unreliable. The predictions generated by the inference models may be expected to be unreliable due to an insufficient amount of training data including data values indicating wind directions between 350 and 10 degrees. Consequently, a degree of variability in the predictions may be expected, the degree of variability being considered unacceptable for reliable inference generation.

Management system 102 may host at least one inference model trained to generate predictions regarding occurrences of future states. The at least one inference model may include a neural network inference model, a digital twin trained to simulate future states based on initial states (e.g., for data processing systems 100), and/or other types of models. The at least one inference model may generate a plurality of predictions (e.g., inferences, simulations) and, during the state analysis process, the plurality of predictions may be analyzed to obtain a statistical characterization regarding agreement in the plurality of predictions. If the statistical characterization meets second criteria (e.g., indicating that no existing policies correspond to the statistical characterization), it may be determined that a new policy is to be generated for the state.

In addition, the plurality of predictions may be used to perform an anomaly detection process to determine whether the predicted state is to be considered anomalous. The anomaly detection process may include using historical state data to determine whether the predicted state is anomalous. If the predicted state is determined to be anomalous, it may be determined that the at least one inference model may not reliably predict the anomalous state (e.g., leading to an undesirable level of disagreement between the predictions for the state) and, therefore, a new policy is to be generated for the state.

Thus, device management services for data processing systems 100 may be provided by management system 102. By doing so, input data for at least one inference model and predictions generated by the at least one inference model may be analyzed using various statistical techniques to determine whether a new policy is to be generated. Based on the results of the analysis, an action set may be obtained and performed to mitigate the effects of undesired outcomes from the occurrence of the state, which may result in computer-implemented services which are more reliable and less likely to be interrupted and/or delayed.

Figure 2A:
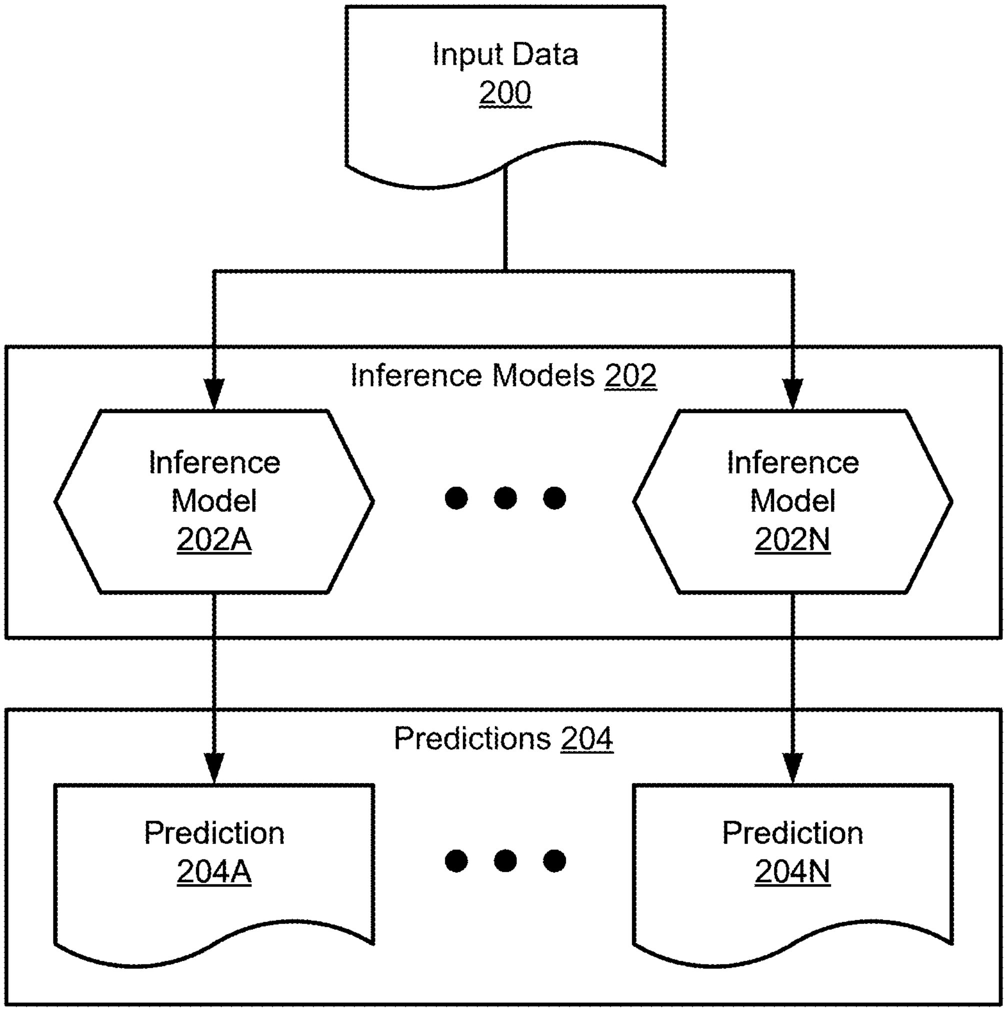
FIGS. 2A-2D show diagrams illustrating data flows in accordance with an embodiment.
Figure 2B:
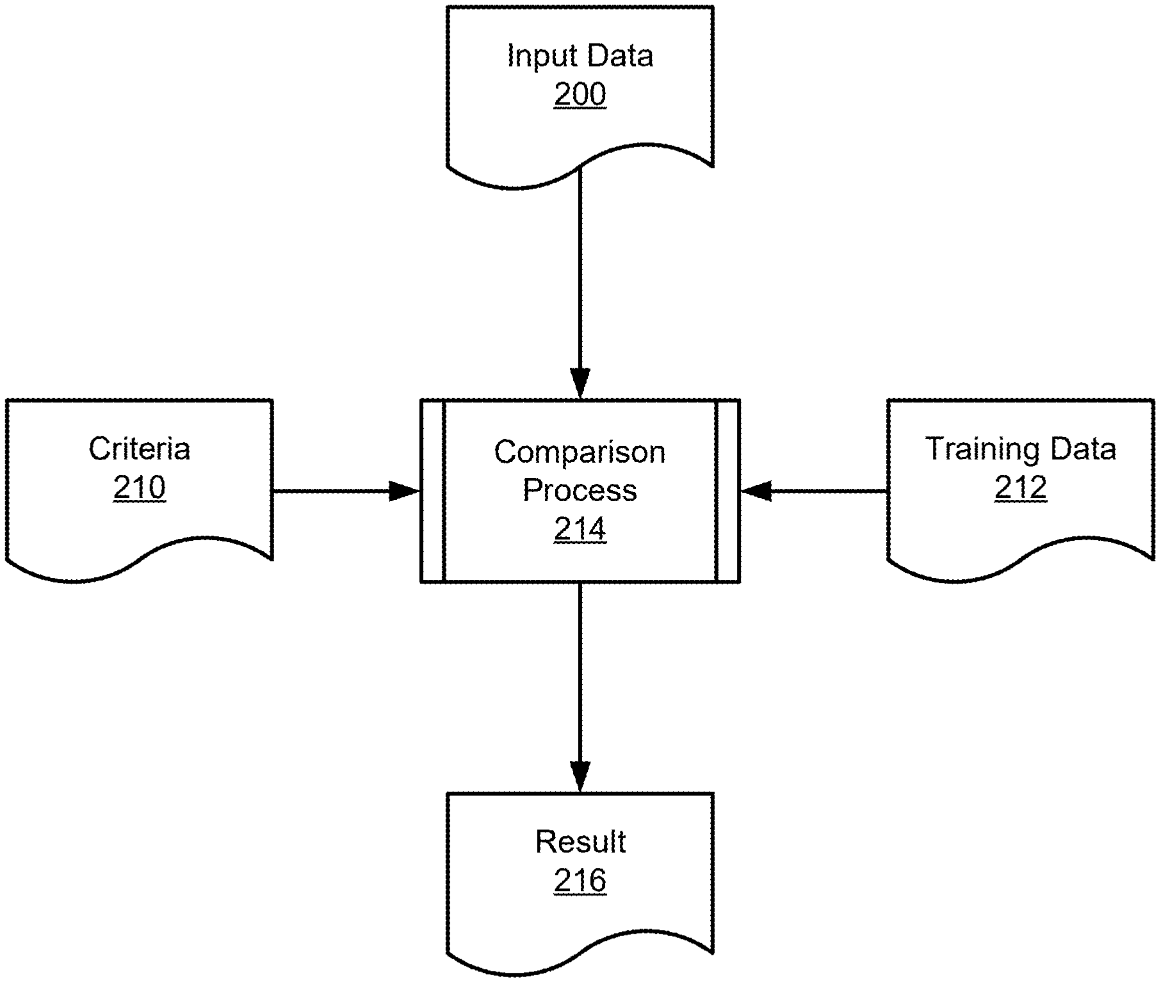
Figure 2C:
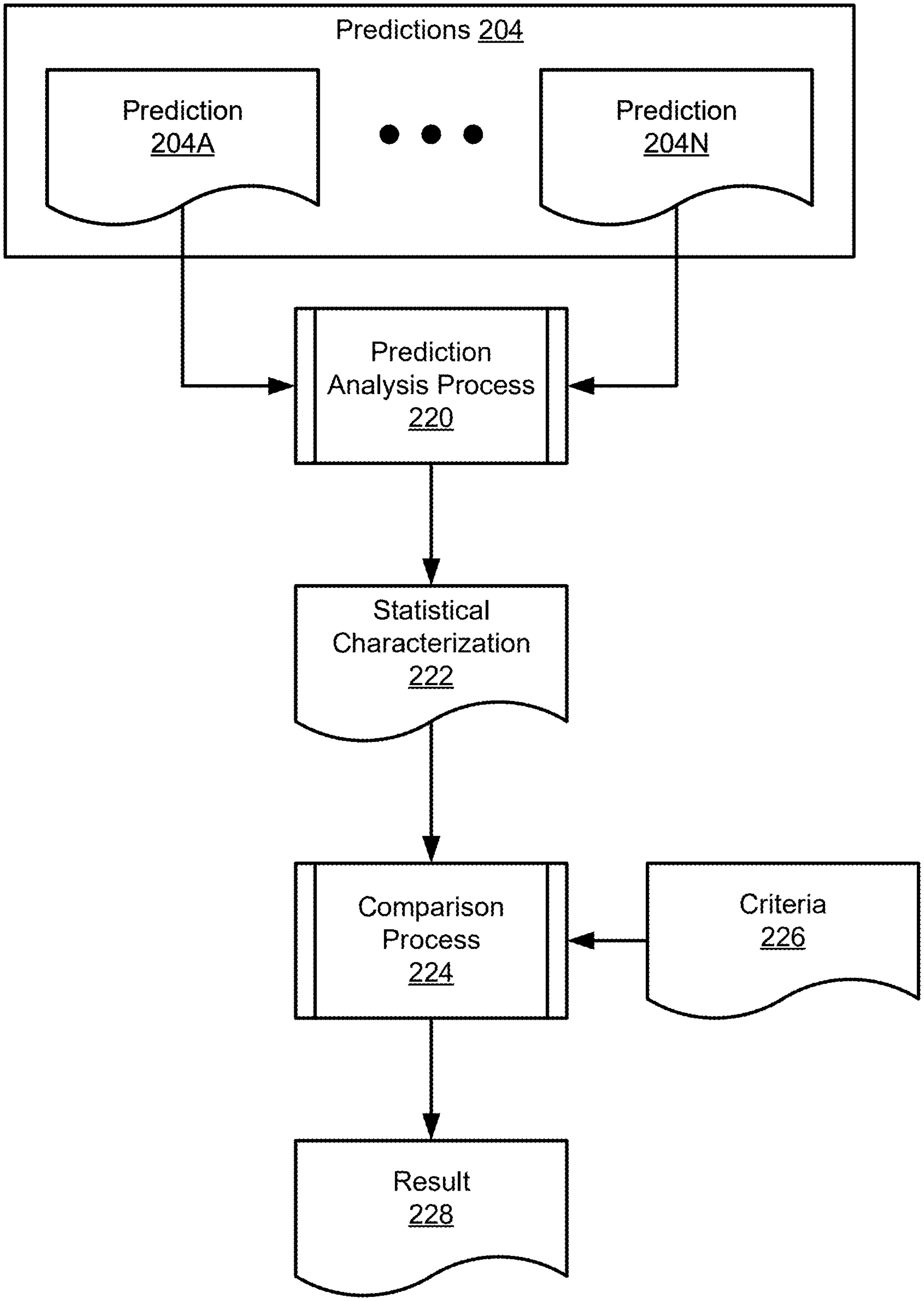
Figure 2D:
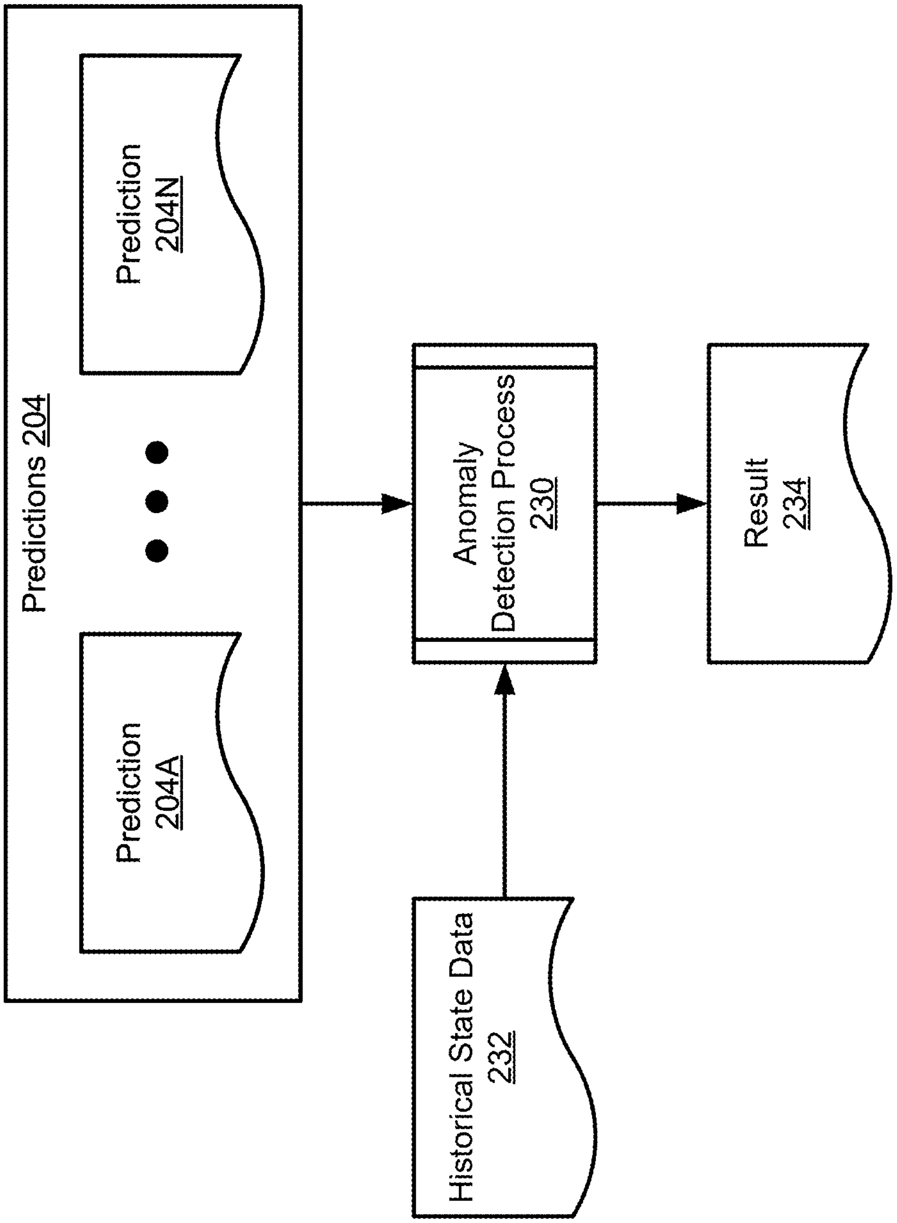
Figure 3:
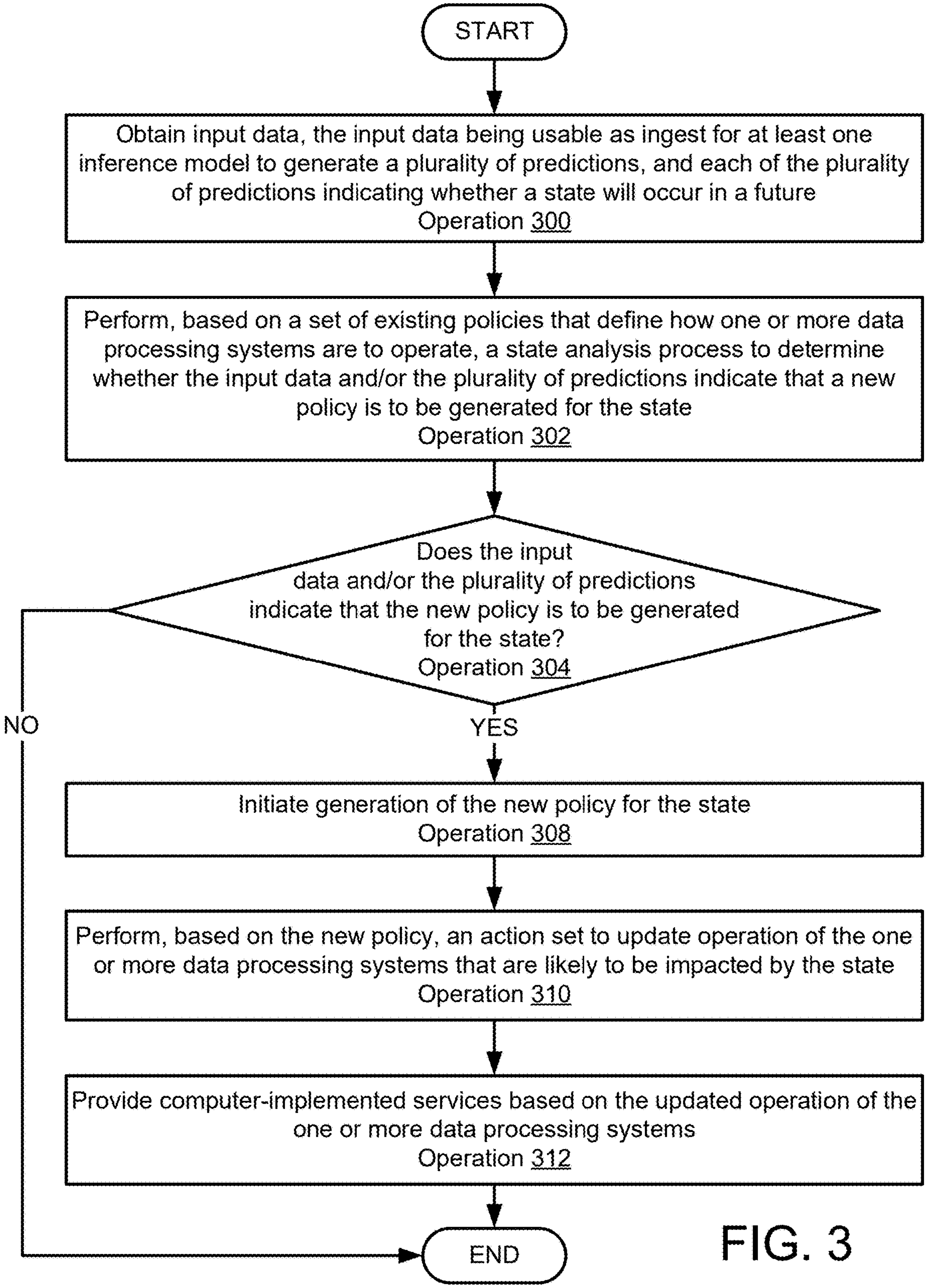
FIG. 3 shows a flow diagram illustrating a method of managing inference models in accordance with an embodiment.

When providing their functionality, any of data processing systems 100, and/or management system 102 may perform all, or a portion, of the processes, interactions, and methods illustrated in FIGS. 2A-3.

Any of data processing systems 100 and/or management system 102 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), and edge device, an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 104. Communication system 104 may facilitate communications between the components of FIG. 1. In an embodiment, communication system 104 includes one or more networks that facilitate communication between any number of components. The networks may include wired networks and/or wireless networks (e.g., and/or the Internet). The networks and communication devices may operate in accordance with any number and types of communication protocols (e.g., such as the Internet protocol).

While illustrated in FIG. 1 as including a limited number of specific components, a system in accordance with an embodiment may include fewer, additional, and/or different components than those illustrated therein. For example, while the system of FIG. 1 shows a single management system (e.g., 102), it will be appreciated that the system may include any number of management systems.

To further clarify embodiments disclosed herein, data flow diagrams in accordance with an embodiment are shown in FIGS. 2A-2D. In these diagrams, flows of data and processing of data are illustrated using different sets of shapes. A first set of shapes (e.g., 200, 210) is used to represent data structures, a second set of shapes (e.g., 214, 220) is used to represent processes performed using and/or that generate data, and a third set of shapes (e.g., 202A) is used to represent inference models.

Turning to FIG. 2A, a first data flow diagram in accordance with an embodiment is shown. The first data flow diagram may illustrate data used in and data processing performed in obtaining a plurality of predictions using at least one inference model.

To obtain the plurality of predictions, input data 200 may be used as ingest to generate predictions using inference models (e.g., inference models 202). The inference models may be hosted by a management system (e.g., management system 102, not shown) responsible for managing operation of data processing systems used to provide computer-implemented services (e.g., data processing systems 100, not shown). Input data 200 may include any type and/or quantity of data, including data generated by data processing systems

100 (e.g., collected using sensors, telemetry data, performance data) and/or data from any other data source (e.g., databases, other management systems, other data processing systems).

Input data 200 may be provided to inference models 202 and used as ingest to generate predictions. Inference models 202 may include any type (e.g., machine learning, decision tree, quantile regression, deterministic simulation, computationally-driven simulation, dynamic simulation, analytical simulation) and/or quantity of inference models (e.g., 202A-202N). Inference models 202 may be trained using training data which defines goals for predictions made by the inference models. Parameters of the inference models may be selected using an optimization process (e.g., an objective function may be defined in terms of the training data and predictions made by the inference models, and a global optimization method such as gradient descent may be used to identify parameters that most faithfully reproduce the trends in the training data).

Once the parameters of an inference model (e.g., inference model 202A) are set, then the inference model may be used to make predictions. A single inference model (e.g., 202A) may be used to generate the predictions and/or a plurality of inference models (e.g., 202A-202N) may be used to generate the predictions. Differences in model type, training data, and/or the selected optimization process may result in variability between the predictions made by the inference models, even when the predictions are generated using the same (and/or substantially the same) input dataset. Additionally, stochastic elements (e.g., random variance in one or more parameters over time) may result in prediction variability (e.g., within a single model and/or simulation) for a given set of conditions.

The input dataset used as ingest for inference models 202 (e.g., input data 200) to generate predictions may be substantially the same for each inference model of the at least one inference model. For example, substantially the same input data may include criteria which permit up to a 10% difference in the input data (e.g., at least 90% of the input data is the same). In another example, the criteria may indicate that the input data may only differ by 5% to be considered substantially the same (e.g., at least 95% of the input data is the same). In a third example, the criteria may indicate that the input data may only differ by 2% to be considered substantially the same (e.g., at least 98% of the input data is the same).

Input data 200 may be ingested by inference models 202, and predictions 204 may be generated as output. Predictions 204 may include a plurality of predictions (e.g., 204A-204N) generated by at least one of inference models 202 that each indicate whether a state will occur in a future (e.g., at any future point in time, over a duration of time beginning at any future point in time). For example, predictions 204 may include predictions regarding states which may impact the operation of data processing systems 100, such as changes in temperature, resource availability (e.g., forecasted changes in power supply and/or demand), weather conditions (e.g., rain, hail, wind, thunderstorms), and/or any other states which may impact the devices.

For example, data processing systems 100 may include edge devices managed by management system 102, which may include smart streetlights. The smart streetlights may be implemented to conserve power by adjusting the amount of light generated based on data collected by sensors. The data collected by the sensors may include data regarding brightness, humidity, motion, temperature, etc. The data may be provided to management system 102 and used, at least in part, as input data for at least one inference model used to generate predictions regarding the occurrence of states which may impact the operation of the smart streetlights.

Thus, by implementing the data flow shown in FIG. 2A, a system in accordance with embodiments disclosed herein may be used to obtain a plurality of predictions generated by at least one inference model. The input data used to generate each prediction may be substantially the same, though differences in inference model types and/or training may result in variability in the predictions.

Turning to FIG. 2B, a second data flow diagram in accordance with an embodiment is shown. The second data flow diagram may illustrate data used in and data processing performed in performing at least a portion of a state analysis process based on input data 200 described in FIG. 2A. The state analysis process may be performed to determine whether a new policy is to be generated for a state predicted by inference models 202 and/or based on conditions indicated by input data 200.

During the state analysis process, comparison process 214 may be performed using input data 200, training data 212, and criteria 210. During comparison process 214, it may be determined whether data values of training data 212 correspond to data values of input data 200 to an extent that meets criteria 210. Training data 212 may include any quantity and/or type of data values that were previously used to train inference models 202. Training data 212 may include data values of a similar type to data values of input data 200 (e.g., temperature data, wind speed data) and/or may include data values of types not included in input data 200.

During comparison process 214, data values of input data 200 may be compared to data values of training data 212. For example, input data 200 may include sensor data (e.g., ambient environment sensors such as temperature sensors, wind sensors, humidity sensors, air pressure sensors) that indicate winds traveling in a first direction (e.g., 360 degrees or north). The type of data of input data 200 (e.g., wind direction) may be compared to wind direction data of training data 212. During the comparison, it may be determined that 80% of wind direction data of training data 212 indicates winds traveling in a second direction (e.g., 180 degrees or south) and only 10% of wind direction data of training data 212 indicating winds traveling in the first direction. The remaining 10% of wind direction data of training data 212 may include winds traveling in directions other than the first direction and the second direction.

Criteria 210 may include a threshold amount of coverage of training data 212 for a condition indicated by input data 200. The threshold amount of coverage may be represented as a threshold quantity of data values (e.g., represented as a number, represented as a percentage of the total) of training data 212 that match data values of input data 200. For example, criteria 210 may indicate that training data 212 may be considered as having sufficient coverage of a condition indicated by input data 200 when at least 50% of data values of training data 212 match data values of input data 200. The threshold quantity of data values may be chosen by any entity (e.g., a downstream consumer, a subject matter expert, a user, an inference model). The at least one inference model hosted by management system 102 (not shown) may be considered unreliable to generate predictions (e.g., inferences) based on input data that does not meet criteria 210 due to an insufficient quantity of training data based on the conditions indicated by the input data.

Continuing with the above example, criteria 210 may be met if at least 50% of data values of training data 212 indicate conditions where winds travel in the first direction.

As previously mentioned, 10% of data values of training data 212 may indicate winds traveling in the first direction and, therefore, criteria 210 may not be met.

Result 216 may be obtained as a result of comparison process 214. Result 216 may include data such as: (i) an indication of whether criteria 210 was met, (ii) data indicating portions of input data 200 and/or training data 212 considered during comparison process 214, (iii) statistics used to determine whether criteria 210 was met (e.g., percentages of data values of training data 212), (iv) instructions indicating that a new policy is to be generated, (v) information regarding an intended recipient of result 216, (vi) a timestamp associated with performance of comparison process 214, and/or (vii) other information.

If result 216 indicates that criteria 210 were not met, it may be determined that inference models 202 were not trained using training data with sufficient coverage of a condition indicated by input data 200. Therefore, a likelihood that inference models 202 may generate unreliable predictions based on input data 200 may be considered unacceptably high (e.g., based on criteria 210). Consequently, result 216 may indicate that a new policy is to be generated.

Generation of a new policy may include providing result 216 to an entity responsible for generation of policies (e.g., a SME, a generative model) and obtaining the new policy in response (not shown). The new policy may include an action set to be performed under a set of conditions corresponding to input data 200 and/or predictions based on input data 200.

For example, the new policy may include an action set to update operation of data processing systems likely to be impacted by the conditions indicated by input data 200 and/or occurrences of states based on the conditions. The action set may indicate, for example, that the drones are to spray pesticides in a new pattern when the wind direction is the first wind direction, that the drones are to move to a sheltered location when the winds are in the first direction, and/or other actions.

In addition, result 216 may include instructions for supplementation of training data 212 with additional data values that match the data values of input data 200 and retraining (e.g., full retraining, partial retraining, generation of synthetic training data values and/or simulations based on the data values of input data 200) of inference models 202 using the updated training data. By doing so, a likelihood that inference models 202 may generate reliable predictions when ingesting data values similar to those included in input data 200 may be increased. In addition, data based on predictions generated by the re-trained inference models may be appended to the new policy when available.

While described in FIG. 2B as using input data 200 to obtain result 216 without generation of predictions by inference models 202, it may be appreciated that input data 200 may be used as ingest for inference models 202 and at least a portion of a plurality of predictions generated by inference models 202 may be used as part of obtaining result 216 (e.g., via an analysis of the plurality of predictions, via comparison of at least a portion of the plurality of predictions and/or a statistic based on the plurality of predictions to a portion of criteria 210 and/or other criteria).

If result 216 indicates that criteria 210 were met, a new policy may not be generated. Consequently, input data 200 may be used as ingest for inference models 202 and the predictions generated by inference models 202 (e.g., predictions 204) may be analyzed to identify an existing policy to be implemented.

Thus, action sets may be obtained in scenarios when input data for the at least one inference model includes data values that the at least one inference model were not sufficiently (e.g., based on comparison to thresholds indicated by criteria) trained to interpret. By doing so, a likelihood of providing computer-implemented services as desired by data processing systems may be increased.

Turning to FIG. 2C, a third data flow diagram in accordance with an embodiment is shown. The third data flow diagram may illustrate data used in and data processing performed in performing at least a portion of a state analysis process based on input data 200 described in FIG. 2A. The state analysis process may be performed to determine whether a new policy is to be generated for a state predicted by inference models 202.

To do so, the plurality of predictions (e.g., predictions 204A-204N) may be used to perform prediction analysis process 220. During prediction analysis process 220, predictions 204 may be analyzed in aggregate to obtain a statistical characterization (e.g., statistical characterization 222) regarding agreement in the plurality of predictions. The statistical characterization may be obtained using any type and/or quantity of statistical methods (e.g., techniques, calculations, data fitting), including averaging, population distribution calculations, hypothesis testing, regression, analysis of variance, and/or any other type of statistical methods. The statistical characterization may include a mean, median, mode, standard deviation, and/or other value for predictions 204.

For example, the at least one inference model may generate predictions based on the sensor data and/or data from other sources regarding an increase in temperature which may affect operation of 100 smart streetlights. For example, temperature data collected by the sensors and temperature data collected from weather satellites may be used as input data for 20 inference models. Of the 20 inference models, 5 may generate predictions indicating the temperature will affect operation of 60 smart streetlights, 10 may generate predictions indicting the temperature will affect operation of 80 smart streetlights, 3 may generate predictions indicating the temperature will affect operation of 75 smart streetlights, and 2 may generate predictions indicting the temperature will affect operation of 10 smart streetlights.

A prediction analysis process may be used to analyze the predictions using statistical methods to obtain statistical characterizations including a median (e.g., 77.5 smart streetlights will be affected) and a standard deviation (e.g., 21.3 smart streetlights).

Thus, by implementing the data flow shown in FIG. 2C, a system in accordance with embodiments disclosed herein may be used to obtain a statistical characterization of a plurality of predictions generated by at least one inference model. The input data used to generate each prediction may be substantially the same, though differences in inference model types and/or training may result in variability in the predictions. The variability in the predictions may be analyzed using statistical methods to identify whether any existing policies correspond to predictions 204.

To determine whether a new policy is to be generated based on statistical characterization 222, comparison process 224 may be performed. To perform comparison process 224, statistical characterization 222 may be compared to criteria (e.g., criteria 226) in order to make a determination regarding whether statistical characterization 222 meets criteria 226. Making the determination may include (i) identifying at least one quantity of statistical characterization 222, (ii) identifying a requirement indicated by criteria 226 that corresponds to the at least one quantity, (iii) analyzing the at least one quantity using the requirement to obtain at least a partial result indicating whether statistical characterization 222 meets criteria 226, and/or (iv) other methods. The at least one quantity may include a numerical value and/or other types of metrics calculated using a statistical method.

Criteria 226 may include requirements corresponding to quantities of statistical characterization 222. For example, the requirements may include a first requirement for a median of the plurality of predictions falling within a first range, and a second requirement for a standard deviation of the plurality of predictions falling within a second range. When the median falls within the first range, then the plurality of predictions may indicate that the state is predicted to occur, and when the standard deviation falls within the second range, then the plurality of predictions may indicate that the occurrence of the state has a level of uncertainty falling within an acceptable range. In this example, a median and/or standard deviation falling outside of their respective ranges may indicate that statistical characterization 222 does not meet criteria 226. Different types of states, affected devices, and/or other characteristics related to the predictions may result in differences in the requirements included in criteria 226.

Returning to the smart streetlights example, the statistical characterization of the plurality of predictions regarding the number of smart streetlights that may be affected by a future temperature increase may include a median of 77.5 and a standard deviation of 21.3. Criteria for the statistical characterization may include a first range corresponding to the median (e.g., 70-100) and a second range corresponding to the standard deviation (e.g., 0-25). It may be determined that the median and the standard deviation fall within their respective ranges, and thus the statistical characterization may meet the criteria.

As a result of comparison process 224, result 228 may be obtained. Result 228 may include data such as: (i) an indication of whether criteria 226 was met, (ii) instructions indicating that a new policy is to be generated, (iii) information regarding an intended recipient of result 228, (iv) a timestamp associated with performance of comparison process 224, and/or (v) other information.

If result 228 indicates that criteria 226 are not met, it may be determined that a new policy is to be generated for the predicted state. This may be due to, for example, inference models 202 not being trained using training data with sufficient coverage of a condition indicated by input data 200 and/or for other reasons. Therefore, a likelihood that predictions 204 are unreliable may be considered sufficiently high (e.g., based on criteria 226). Consequently, result 228 may indicate that a new policy is to be generated.

Generation of a new policy may include providing result 228 to an entity responsible for generation of policies (e.g., a SME, an inference model) and obtaining the new policy in response (not shown). Any portion of input data 200 and/or predictions 204 may also be provided to the entity. The new policy may include an action set to be performed under a set of conditions corresponding to input data 200 and/or predictions 204.

Thus, by implementing the data flow shown in FIG. 2C, a system in accordance with embodiments disclosed herein may increase a likelihood of generating an action set to update an operating state of a data processing system in a manner that hedges against a potential undesired outcome of a state predicted by the at least one inference model.

Turning to FIG. 2D, a fourth data flow diagram in accordance with an embodiment is shown. The fourth data flow diagram may illustrate data used in and data processing performed in performing at least a portion of a state analysis process based on input data 200 described in FIG. 2A. The state analysis process may be performed to determine whether a new policy is to be generated for a state predicted by inference models 202.

To do so, anomaly detection process 230 may be performed using at least predictions 204 and historical state data 232. Predictions 204 may be analyzed to obtain a statistical characterization regarding agreement in predictions 204 (e.g., statistical characterization 222 described in FIG. 2C). Agreement in predictions 204 may be analyzed to determine a degree of variability between predictions of predictions 204 as described in FIG. 2C.

The statistical characterization of predictions 204 may not indicate (e.g., via a comparison to criteria such as criteria 226 in FIG. 2C) that predictions 204 display a degree of variability considered unacceptable (e.g., statistical characterization 222 may met criteria 226). However, the state predicted by predictions 204 may not be associated with any existing policies if the state is an anomalous state.

To determine whether the state is an anomalous state, anomaly detection process 230 may be performed. During anomaly detection process 230, any anomaly detection method may be utilized (e.g., neural networks, support vector machines, autoencoders, isolation forests, k-nearest neighbor) to determine whether the state indicated by predictions 204 is anomalous with respect to historical state data 232. For example, inference models 202 may have ingested input data 200 to generate predictions 204 and predictions 204 may, in aggregate, (e.g., within a threshold as previously described) predict that a sandstorm is likely to impact operation of drones operating in an ambient environment. A sandstorm may not have occurred in any states recorded as part of historical state data 232 and/or sandstorms may occur infrequently (e.g., based on the anomaly detection parameters) to be considered an edge state (e.g., an anomalous state).

The existing policies (not shown) may not include any policies indicating actions to be performed in the state of a sandstorm. Therefore, if anomaly detection process 230 indicates that the state predicted by predictions 204 is anomalous, result 234 may indicate that a new policy is to be generated. The new policy, therefore, may include actions to be performed if a sandstorm is predicted by inference models 202.

Generation of a new policy may include providing result 234 to an entity responsible for generation of policies (e.g., a SME, an inference model) and obtaining the new policy in response (not shown). Any portion of input data 200 and/or predictions 204 may also be provided to the entity. The new policy may include an action set to be performed under a set of conditions corresponding to the anomalous state predicted by predictions 204 (e.g., the sandstorm). The action set may include, for example, instructing the drones to leave the field and hide in a sheltered location for a duration of time to avoid structural damage to the drones and/or loss of the drones.

Thus, by implementing the data flow shown in FIG. 2D, a system in accordance with embodiments disclosed herein may increase the likelihood of generating an action set to update an operating state of a data processing system. The updated operating state may reduce an impact of an undesired outcome from the occurrence of a state predicted by at least one inference model.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1-2D may perform various methods to manage inference models. FIG. 3 illustrates a method that may be performed by the components of the system of FIGS. 1-2D. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing inference models in accordance with an embodiment is shown. The method may be performed, for example, by any of the components of the system of FIG. 1, and/or any other entity without departing from embodiments disclosed herein.

At operation 300, input data may be obtained. The input data may be usable as ingest for at least one inference model to generate a plurality of predictions, and each of the plurality of predictions may indicate whether a state will occur in a future (e.g., at any future point in time, over a duration of time beginning at any future point in time).

Obtaining the input data may include (i) reading the input data from storage, (ii) receiving the input data from data processing systems (e.g., via a message, by reading the input data from a storage used by the data processing systems to store data), (iii) receiving the input data from other devices (e.g., via a message), (iv) performing a lookup in a database for data relevant to generating the plurality of predictions, and/or (v) other methods.

Following obtaining the input data, the input data may be used as ingest for the at least one inference model to obtain the plurality of predictions. Obtaining the plurality of predictions may include (i) using the input data as ingest for the at least one inference model (e.g., feeding the input data into the at least one inference model to generate predictions), (ii) obtaining the plurality of predictions as output of the at least one inference model (e.g., generating the predictions by the inference models using the input data), and/or (iii) other methods.

Each prediction of the plurality of predictions may be substantially generated using a same input dataset. Substantially generating the plurality of predictions using the same input dataset may include generating the plurality of predictions using input data for each inference model of the at least one inference model which (i) differs by less than 5% (e.g., the input dataset is at least 95% the same), (ii) differs by less than 10% (e.g., the input dataset is at least 90% the same), (iii) differs by less than 25% (e.g., the input dataset is at least 75% the same), and/or (iv) differs by any other amount which is determined by a subject matter expert to result in an input dataset that is substantially the same.

At operation 302, a state analysis process may be performed, based on a set of existing policies that define how one or more data processing systems are to operate, to determine whether the input data and/or the plurality of predictions indicate that a new policy is to be generated for the state.

In a first example, performing the state analysis process may include: (i) obtaining training data, the training data being previously used to train the at least one inference model, and/or (ii) determining, based on the input data and the training data, whether the training data includes data values that correspond to data values of the input data to an extent that meets first criteria. If the training data does not include data values that correspond to data values of the input data to an extent that meets the first criteria, performing the state analysis may also include concluding that the input data may indicate that the new policy is to be generated for the state.

Obtaining the training data may include: (i) reading the training data from storage (e.g., a training data repository), (ii) receiving the training data from another entity (e.g., as a message over a communication system), and/or (iii) other methods.

Determining whether the training data includes data values that correspond to data values of the input data to an extent that meets first criteria may include: (i) obtaining the data values of the training data and the data values of the input data, (ii) comparing the data values of the input data to the data values of the training data to obtain a degree of similarity between the data values of the input data and the data values of the training data (e.g., via generation of any similarity metric, via generation of an aggregated statistic), (iii) comparing a quantification of the degree of similarity (e.g., the similarity metric, the aggregated statistic) to a corresponding requirement included in the first criteria, and/or (iv) other methods.

The first criteria may include a threshold requirement for the quantification of the degree of similarity. For example, if the quantification of the degree of similarity includes a quantity of matching data values, the first criteria may include a threshold quantity of matching data values. If the quantity of matching data values meets the threshold quantity of matching data values, the first criteria may be met.

The first criteria may be based on a set of existing policies. The set of existing policies may have been previously generated and may be stored (e.g., locally, remotely) in a policy database. Therefore, each policy of the existing policies may correspond to input data values that match data values of the training data to an extent that meets the first criteria.

Determining whether the training data includes data values that correspond to data values of the input data to an extent that meets first criteria may also include providing the training data and the input data to another entity responsible for performing the comparison process and receiving a result of the comparison process in response from the entity.

If the first criteria are met, it may be concluded that the at least one inference model were previously trained using training data with sufficient coverage (e.g., that included a quantity of data values that match data values of the input data to an extent that meets the first criteria) to reliably make predictions based on the input data. Data values of the training data may match data values of the input data when a condition indicated by the data values is substantially similar.

In an embodiment, the condition indicated by the data values are substantially similar when the data values are within a one percent deviation.

In an embodiment, the condition indicated by the data values are substantially similar when the data values are within a three percent deviation.

In an embodiment, the condition indicated by the data values are substantially similar when the data values are within a five percent deviation.

For example, data values of the training data that indicate wind speeds traveling in a first direction (e.g., 180 degrees or south) may be considered substantially the same as data values of the input data that indicate wind speeds traveling in the first direction within a deviation of three percent.

If the first criteria are not met, concluding that the input data indicates that the new policy is to be generated for the state may include: (i) generating a log entry, the log entry indicating that none of the existing policies are sufficiently applicable to the state, (ii) providing a notification to another entity indicating that the new policy is to be generated, and/or (iii) other methods.

In a second example, performing the state analysis process may include: (i) analyzing the plurality of predictions to obtain a statistical characterization regarding agreement in the plurality of predictions, and/or (ii) determining whether the statistical characterization meets second criteria. If the statistical characterization does not meet the second criteria, performing the state analysis process may also include concluding that the plurality of predictions may indicate that the new policy is to be generated for the state.

Analyzing the plurality of predictions may include (i) aggregating the plurality of predictions into a dataset, (ii) using statistical methods to obtain the statistical characterization of the dataset, (iii) proving the dataset to another device and receiving the statistical characterization in response, and/or (iv) other methods.

Using statistical methods may include performing statistical calculations (e.g., averaging, population distribution calculations, hypothesis testing, regression, analysis of variance) to obtain the statistical characterization. The statistical characterization may include a mean, median, mode, standard deviation and/or any other type of statistical characterization of the dataset usable to determine agreement in the plurality of predictions.

Determining whether the statistical characterization meets the second criteria may include (i) identifying at least one quantity of the statistical characterization (e.g., analyzing the statistical characterization to extract a numerical value and/or other type of metric), (ii) identifying a requirement indicated by the second criteria that corresponds to the at least one quantity, (iii) analyzing the at least one quantity using the requirement to obtain at least a partial result indicating whether the statistical characterization meets the second criteria, and/or (iv) other methods.

Identifying the requirement indicated by the second criteria may include (i) parsing the second criteria to identify the requirement corresponding to a type of statistical characterization obtained by analyzing the plurality of predictions, (ii) analyzing the requirement to extract a quantity and/or range of quantities indicated by the requirement, (iii) providing the second criteria to another device and receiving the requirement in response, and/or (iv) other methods.

Analyzing the at least one quantity using the requirement may include (i) comparing the quantity of the statistical characterization to the quantity and/or range of quantities indicated by the requirement, (ii) determining whether the quantity of the statistical characterization equals and/or exceeds the quantity indicated by the requirement to obtain at least the partial result, (iii) determining whether the quantity of the statistical characterization falls within the range of quantities indicated by the requirement to obtain at least the partial result, (iv) providing the requirement and the quantity of the statistical characterization to another device and receiving at least the partial result in response, and/or (v) other methods.

Determining whether the statistical characterization meets the second criteria may also include: (i) parsing at least the partial result to ascertain whether the partial result indicates the statistical characterization meets the second criteria, (ii) providing the partial result to another device and receiving a determination regarding whether the statistical characterization meets the second criteria in response, and/or (iii) other methods.

If the second criteria are not met, it may be concluded that the plurality of predictions indicate that a new policy is to be generated for the state. Concluding that the new policy is to be generated for the state may include: (i) generating a log entry, the log entry indicating that none of the existing policies are sufficiently applicable to the state, (ii) providing a notification to another entity indicating that the new policy is to be generated, and/or (iii) other methods.

If the second criteria are met, performing the state analysis process may also include performing, using the plurality of predictions and historical state data, an anomaly detection process to determine whether the state is anomalous. Performing the anomaly detection process may include: (i) feeding the plurality of predictions and the historical state data into a model and/or algorithm trained to perform anomaly detection (e.g., a neural network, a cluster analysis algorithm, an autoencoder, an isolation forest algorithm), (ii) obtaining a degree of anomalousness for the plurality of predictions as an output of the anomaly detection algorithm and/or model, (iii) comparing the degree of anomalousness to a threshold degree of anomalousness, and/or (iv) if the degree of anomalousness meets the threshold degree of anomalousness, concluding that the state predicted by the plurality of predictions is an anomalous state. Anomaly detection may be performed via any other anomaly detection process and/or based on any other requirements (e.g., other types of thresholds) without departing from embodiments disclosed herein.

Performing the anomaly detection process may include providing the plurality of predictions and/or the historical state data to another entity responsible for performing the anomaly detection process and/or other methods.

If the state is determined to be anomalous, performing the state analysis process may also include concluding that the plurality of predictions indicate that the new policy is to be generated for the state. Concluding that the plurality of predictions indicates that the new policy is to be generated for the state may include: (i) generating a log entry, the log entry indicating that none of the existing policies are sufficiently applicable to the state, (ii) providing a notification to another entity indicating that the new policy is to be generated, and/or (iii) other methods.

At operation 304, it may be determined whether the input data and/or the plurality of predictions indicate that the new policy is to be generated for the state. Determining whether the input data and/or the plurality of predictions indicate that the new policy is to be generated for the state may include: (i) obtaining a result of the state analysis process (e.g., reading it from storage, receiving it from another entity), (ii) reading the result of the state analysis process, (iii) providing the result of the state analysis process to another entity, and/or (iv) other methods.

If the input data and/or the plurality of predictions do not indicate that the new policy is to be generated for the state, the method may end following operation 304. An existing policy of the existing policies may be selected based on the statistical characterization and/or other characteristics of the input data and/or the plurality of predictions. An action set may be obtained from the existing policy and the operation of the data processing systems may be updated based on the action set.

For example, the plurality of predictions may be keyed to an existing policy that is currently in effect for the plurality of data processing systems and, therefore, no changes may be made to the operation of the data processing systems. If the plurality of predictions is keyed to an existing policy that is not currently in effect, the operation of the plurality of data processing systems may be updated using an action set obtained from a policy keyed to the plurality of predictions and/or a statistical characteristic of the plurality of predictions.

If the input data and/or the plurality of predictions indicate that the new policy is to be generated for the state, the method may proceed to operation 308.

At operation 308, generation of the new policy for the state may be initiated. Initiating generation of the new policy may include: (i) providing a set of conditions corresponding to the input data and/or the plurality of predictions to a SME, (ii) generating the new policy (e.g., via an automated system such as a generative inference model), and/or (iii) other methods.

Providing the set of conditions corresponding to the input data and/or the plurality of predictions to the SME may include: (i) providing the set of conditions as a data package to the SME via a message over a communication system (e.g., a popup interface, an electronic message, a graphical user interface on a device), (ii) storing the set of conditions in a storage architecture shared with the SME and notifying the SME that a new policy is to be generated, (iii) providing the set of conditions to another entity responsible for interacting with the SME, and/or (iv) other methods.

At operation 310, an action set may be performed based on the new policy to update operation of the one or more data processing systems that may be likely to be impacted by the state. Performing the action set may include: (i) obtaining the action set (e.g., from the SME, from storage, from another entity), (ii) transmitting instructions to the data processing systems, the instructions indicating the actions to be performed based on the action set, (iii) parsing the instructions by the data processing systems, (iii) executing the instructions to update the operating state of the one or more data processing systems to an updated operating state, and/or (iv) other methods.

At operation 312, computer-implemented services may be provided based on the updated operation of the one or more data processing systems. Providing the computer-implemented services in the updated operating state may include (i) initiating performance of functions of the data processing systems in a modified state (e.g., at a reduced power, at a reduced processor frequency), (ii) initiating performance of the functions of the data processing systems in a different location (e.g., in a location where the state is not predicted to occur), (iii) initiating performance of the functions of the data processing systems at a different time (e.g., before and/or after the occurrence of the state), and/or (iv) other methods.

The method may end following operation 312.

Thus, using the methods illustrated in FIG. 3, embodiments disclosed herein may provide systems and methods usable to manage inference models by determining whether conditions are met under which new policies are to be generated (e.g., no existing policies may be trusted to update operation of data processing systems). If conditions (e.g., conditions of the input data and/or a plurality of predictions based on the input data) indicate that a new policy is to be generated, generation of the new policy may be dynamically initiated. An action set may be obtained based on the new policy, and the performance of the action set may allow for the provision of computer-implemented services by one or more data processing systems in an updated operating state. The updated operating state may hedge against a risk of undesired outcomes from state a state indicated by the plurality of predictions.

Figure 4:
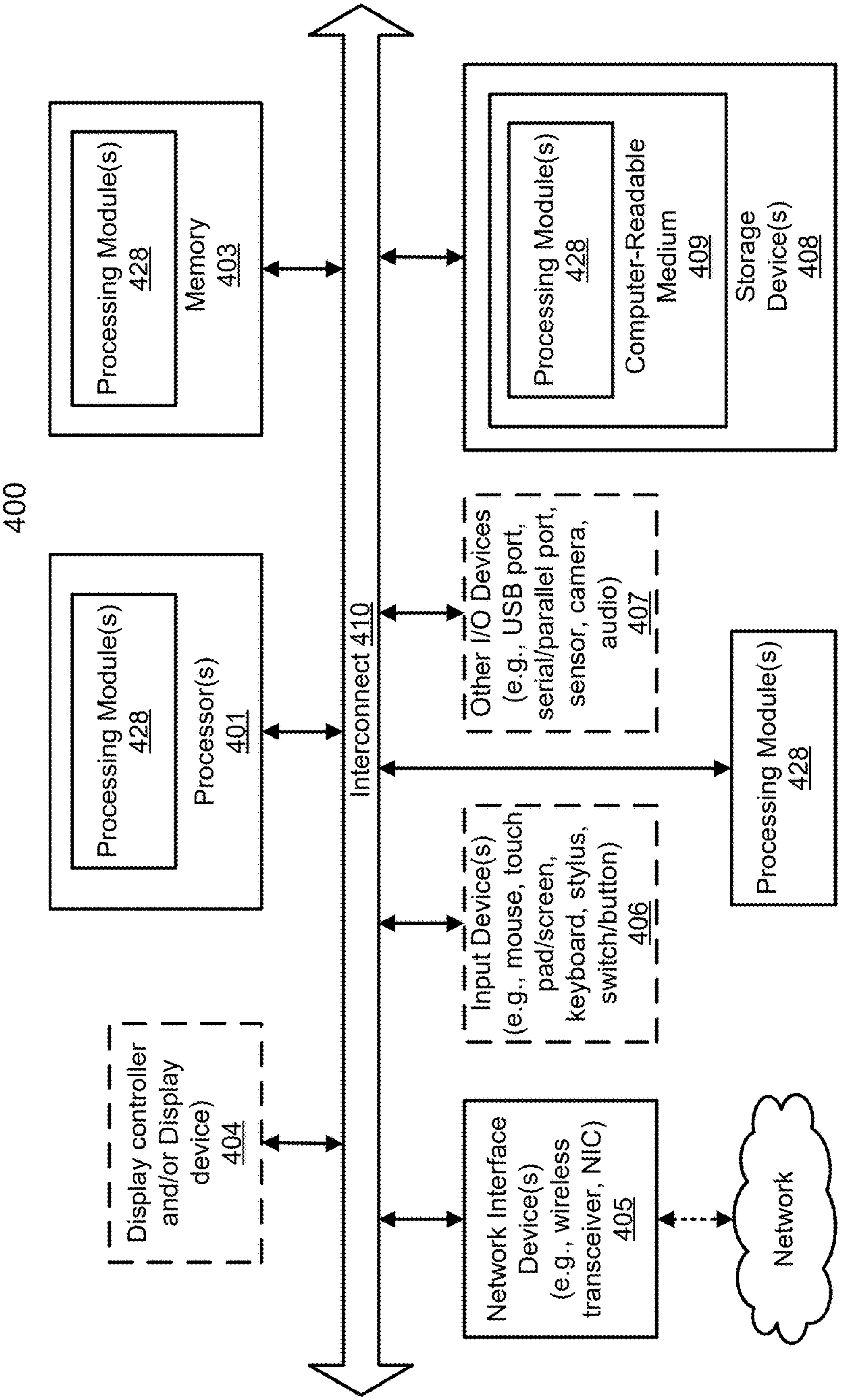
FIG. 4 shows a block diagram illustrating a data processing system in accordance with an embodiment.

Any of the components illustrated in FIGS. 1-2D may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term “machine” or “system” shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down states so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing at least one inference model, the method comprising:

obtaining input data, the input data being usable as ingest for the at least one inference model to generate a plurality of predictions, and each of the plurality of predictions indicating whether a state will occur in a future;

performing, based on a set of existing policies that define how one or more data processing systems are to operate, a state analysis process to determine whether the input data and/or the plurality of predictions indicate that a new policy is to be generated for the state, wherein the state analysis process comprises:

obtaining training data, the training data being previously used to train the at least one inference model;

making a determination, based on the input data and the training data, regarding whether the training data comprises data values that correspond to data values of the input data to an extent that meets criteria; and in an instance of the determination in which the training data does not comprise data values that correspond to data values of the input data to an extent that meets criteria:

concluding that the input data indicates that the new policy is to be generated for the state; and in an instance of the state analysis process in which the input data and/or the plurality of predictions indicate that the new policy is to be generated for the state:

initiating generation of the new policy for the state;

performing, based on the new policy, an action set to update operation of the one or more data processing systems that are likely to be impacted by the state; and providing computer-implemented services based on the updated operation of the one or more data processing systems.

2. The method of claim 1, wherein the criteria are met when at least a threshold quantity of the data values of the training data corresponds to the data values of the input data, and the criteria is indicated by the set of existing policies.

3. The method of claim 1, wherein performing the state analysis process comprises:

analyzing the plurality of predictions to obtain a statistical characterization regarding agreement in the plurality of predictions;

making a determination regarding whether the statistical characterization meets criteria; and in a first instance of the determination in which the statistical characterization does not meet the criteria:

concluding that the plurality of predictions indicate that the new policy is to be generated for the state.

4. The method of claim 3, wherein the statistical characterization comprises at least one quantity selected from a group consisting of:

a mean;

a median;

a mode; and a standard deviation.

5. The method of claim 3, wherein performing the state analysis process further comprises:

in a second instance of the determination in which the statistical characterization does not meet the criteria:

performing, using the plurality of predictions and historical state data, an anomaly detection process to determine whether the state is anomalous; and in an instance of the performing in which the state is anomalous:

concluding that the plurality of predictions indicate that the new policy is to be generated for the state.

6. The method of claim 1, wherein the new policy comprises an action set to be performed under a set of conditions corresponding to the input data and/or the plurality of predictions.

7. The method of claim 6, wherein initiating the generation of the new policy for the state comprises providing the set of conditions corresponding to the input data and/or the plurality of predictions to a subject matter expert (SME).

8. The method of claim 1, wherein each prediction of the plurality of predictions is generated using the input data, the input data being generated by a plurality of data processing systems.

9. A non-transitory machine-readable medium having instructions stored therein, which when executed by a processor, cause the processor to perform operations for managing at least one inference model, the operations comprising:

obtaining input data, the input data being usable as ingest for the at least one inference model to generate a plurality of predictions, and each of the plurality of predictions indicating whether a state will occur in a future;

performing, based on a set of existing policies that define how one or more data processing systems are to operate, a state analysis process to determine whether the input data and/or the plurality of predictions indicate that a new policy is to be generated for the state, wherein the state analysis process comprises:

obtaining training data, the training data being previously used to train the at least one inference model;

making a determination, based on the input data and the training data, regarding whether the training data comprises data values that correspond to data values of the input data to an extent that meets criteria; and in an instance of the determination in which the training data does not comprise data values that correspond to data values of the input data to an extent that meets criteria:

concluding that the input data indicates that the new policy is to be generated for the state; and in an instance of the state analysis process in which the input data and/or the plurality of predictions indicate that the new policy is to be generated for the state:

initiating generation of the new policy for the state;

performing, based on the new policy, an action set to update operation of the one or more data processing systems that are likely to be impacted by the state; and providing computer-implemented services based on the updated operation of the one or more data processing systems.

10. The non-transitory machine-readable medium of claim 9, wherein the criteria are met when at least a threshold quantity of the data values of the training data corresponds to the data values of the input data, and the criteria is indicated by the set of existing policies.

11. The non-transitory machine-readable medium of claim 9, wherein performing the state analysis process comprises:

analyzing the plurality of predictions to obtain a statistical characterization regarding agreement in the plurality of predictions;

making a determination regarding whether the statistical characterization meets criteria; and in a first instance of the determination in which the statistical characterization meets the criteria:

concluding that the plurality of predictions indicate that the new policy is to be generated for the state.

12. The non-transitory machine-readable medium of claim 11, wherein the statistical characterization comprises at least one quantity selected from a group consisting of:

a mean;

a median;

a mode; and a standard deviation.

13. The non-transitory machine-readable medium of claim 11, wherein performing the state analysis process further comprises:

in a second instance of the determination in which the statistical characterization does not meet the criteria:

performing, using the plurality of predictions and historical state data, an anomaly detection process to determine whether the state is anomalous; and in an instance of the performing in which the state is anomalous:

concluding that the plurality of predictions indicate that the new policy is to be generated for the state.

14. A data processing system, comprising:

a processor; and a memory coupled to the processor to store instructions, which when executed by the processor, cause the processor to perform operations for managing at least one inference model, the operations comprising:

obtaining input data, the input data being usable as ingest for the at least one inference model to generate a plurality of predictions, and each of the plurality of predictions indicating whether a state will occur in a future;

performing, based on a set of existing policies that define how one or more data processing systems are to operate, a state analysis process to determine whether the input data and/or the plurality of predictions indicate that a new policy is to be generated for the state, wherein the state analysis process comprises:

obtaining training data, the training data being previously used to train the at least one inference model;

making a determination, based on the input data and the training data, regarding whether the training data comprises data values that correspond to data values of the input data to an extent that meets criteria; and in an instance of the determination in which the training data does not comprise data values that correspond to data values of the input data to an extent that meets criteria:

concluding that the input data indicates that the new policy is to be generated for the state; and in an instance of the state analysis process in which the input data and/or the plurality of predictions indicate that the new policy is to be generated for the state:

initiating generation of the new policy for the state;

performing, based on the new policy, an action set to update operation of the one or more data processing systems that are likely to be impacted by the state; and providing computer-implemented services based on the updated operation of the one or more data processing systems.

15. The data processing system of claim 14, wherein the criteria are met when at least a threshold quantity of the data values of the training data corresponds to the data values of the input data, and the criteria is indicated by the set of existing policies.

16. The data processing system of claim 14, wherein performing the state analysis process comprises:

analyzing the plurality of predictions to obtain a statistical characterization regarding agreement in the plurality of predictions;

making a determination regarding whether the statistical characterization meets criteria; and in a first instance of the determination in which the statistical characterization meets the criteria:

concluding that the plurality of predictions indicate that the new policy is to be generated for the state.

17. The data processing system of claim 16, wherein the statistical characterization comprises at least one quantity selected from a group consisting of:

a mean;

a median;

a mode; and a standard deviation.

18. The data processing system of claim 16, wherein performing the state analysis process further comprises:

in a second instance of the determination in which the statistical characterization does not meet the criteria:

performing, using the plurality of predictions and historical state data, an anomaly detection process to determine whether the state is anomalous; and in an instance of the performing in which the state is anomalous:

concluding that the plurality of predictions indicate that the new policy is to be generated for the state.

19. The data processing system of claim 14, wherein the new policy comprises an action set to be performed under a set of conditions corresponding to the input data and/or the plurality of predictions.

20. The data processing system of claim 19, wherein initiating the generation of the new policy for the state comprises providing the set of conditions corresponding to the input data and/or the plurality of predictions to a subject matter expert (SME).

* * * * *